United States Patent [19]
Detenon

[11] Patent Number: 6,027,676
[45] Date of Patent: Feb. 22, 2000

[54] METHOD AND APPARATUS OF FORMING ORNAMENTED PLASTICS ARTICLES

[75] Inventor: Robert Detenon, Gidea Park, United Kingdom

[73] Assignee: Robobond Limited, United Kingdom

[21] Appl. No.: 08/848,818

[22] Filed: May 1, 1997

[30] Foreign Application Priority Data

Dec. 4, 1996 [GB] United Kingdom .................. 9625192

[51] Int. Cl.[7] .......................... B29C 43/40; B29C 43/52; B29C 47/00; B29C 59/02
[52] U.S. Cl. ...................... 264/132; 264/210.1; 264/151; 264/284; 264/293; 425/143; 425/296; 425/304; 425/385; 425/394; 425/403.1
[58] Field of Search ................................ 264/132, 210.1, 264/210.5, 151, 284, 293; 425/385, 296, 302.1, 304, 394, 327, 143, 403.1

[56] References Cited

U.S. PATENT DOCUMENTS

| | | | |
|---|---|---|---|
| 3,600,918 | 8/1971 | Lemelson | 264/132 |
| 3,795,571 | 3/1974 | Prentice | 264/210.1 |
| 3,883,631 | 5/1975 | Murray | 425/327 |
| 4,288,400 | 9/1981 | Winstead | 264/210.1 |
| 4,489,019 | 12/1984 | Takeda et al. | |
| 4,925,512 | 5/1990 | Briand . | |
| 4,971,544 | 11/1990 | Schneeberger | 264/210.1 |
| 5,023,033 | 6/1991 | Cakmakci | 425/394 |
| 5,366,578 | 11/1994 | Vanhook et al. | 264/210.1 |
| 5,401,154 | 3/1995 | Sargent . | |
| 5,478,516 | 12/1995 | Malm et al. | 264/132 |

FOREIGN PATENT DOCUMENTS

| | | |
|---|---|---|
| 0723845 | 7/1996 | European Pat. Off. . |
| 1395995 | 3/1965 | France . |
| 1401394 | 4/1965 | France . |
| 2698578 | 3/1994 | France . |
| 4228194 | 3/1994 | Germany . |
| 4-363227 | 12/1992 | Japan .................................. 264/210.1 |
| 907624 | 10/1962 | United Kingdom .................. 425/327 |
| 1443194 | 7/1976 | United Kingdom . |
| 2225275 | 5/1990 | United Kingdom . |
| 9200177 | 1/1992 | WIPO . |

*Primary Examiner*—David A. Simmons
*Assistant Examiner*—Robert A. Hopkins
*Attorney, Agent, or Firm*—Factor and Shaftal

[57] ABSTRACT

The present invention relates to a method of forming ornamented plastics articles and to articles formed by the method and relates especially but not exclusively to manufacture of items of furniture, building components and picture frame members. The method comprises firstly extruding a plastics article then re-moulding it in a hot stamp press. This enables highly complex forms of article to be manufactured with large dimensions and at much lower cost than is currently possible.

11 Claims, 1 Drawing Sheet

METHOD AND APPARATUS OF FORMING ORNAMENTED PLASTICS ARTICLES

FIELD OF THE INVENTION

The present invention relates to a method of forming ornamented plastics articles and to articles formed by the method and relates especially but not exclusively to manufacture of items of furniture, building components and picture frame members.

BACKGROUND TO THE INVENTION

Plastics materials have been used widely throughout the furniture industry for many years whether it be in the form of, for example, the flexible plastics sheet upholstery covers or stuffed flexible plastic foam upholstery filling of sofa suites, the substantially rigid mouldings of diner or patio plastics chairs or the completely rigid hard plastics tops of patio tables.

One area, however, of the furniture industry that has not previously significantly benefited from the range of plastics materials currently available is the manufacture of heavily ornamented or embossed designer furniture.

Existing materials and techniques of forming substantially rigid plastics articles do not allow for efficient economical manufacture of products that have an ornate embossed appearance and the furniture industry has, therefore, largely ignored use of plastics materials for this purpose. Injection moulding, the commonest method for forming thermoplastic articles, does not allow for low cost large scale (high production rate) manufacture of sizeable ornamented plastics articles.

It is, therefore, a general objective of the present invention to provide a method of forming plastics materials to provide them with a relatively ornate, embossed appearance and in an efficient, cost effective manner.

SUMMARY OF THE INVENTION

According to a first aspect of the present invention there is provided a method of forming ornamented plastics articles which comprises firstly extruding plastics material and then re-moulding it in a hot stamp press.

A hydraulic press of a meter or longer in length and suitably of the order of three meters in length is ideally provided for the second stage of the forming process to enable sizeable furniture components to be formed by the technique.

A particular problem that occurs when seeking to form components of this size is the problem of bowing. It has been found, however, that by controlling the temperature of the press not only at the dye above but also at the platen below the extrusion any tendency to bow upwardly may be counteracted.

Embodiments of the invention may comprise use of a hydraulic press of even four meters in length. This may be particularly useful for such items as cornices, dado rails and coving. Indeed, it is with the longest extrusions that the greatest cost advantage is achieved over injection moulding.

The preferred plastics materials for use in the invention include polyvinylchloride and polystyrene. Preferably the plastics material is extruded as a foam and suitably comprises foamed polystyrene or foamed PVC.

The pressing of the plastics extrusion may be carried out on or off line, ie with the press physically positioned immediately after the extruder to press the plastics extrusion before it is cut and transported elsewhere or first cut and then transported to a nearby hydraulic press.

In order to form the plastics extrusions in an on-line configuration while enabling substantially continuous extrusion the hydraulic press is suitably mounted on wheels or other transport means and powered to move with the advancing extrusion until the pressing step is complete.

The effect achievable from the invention is similar to the ornate appearance achievable from an injection moulding but at a fraction of the cost.

BRIEF DESCRIPTION OF THE DRAWINGS

A preferred embodiment of the present invention will now be more particularly described, by way of example, with reference to the accompanying drawings, wherein.

DESCRIPTION OF THE PREFERRED EMBODIMENT

Figure 1:
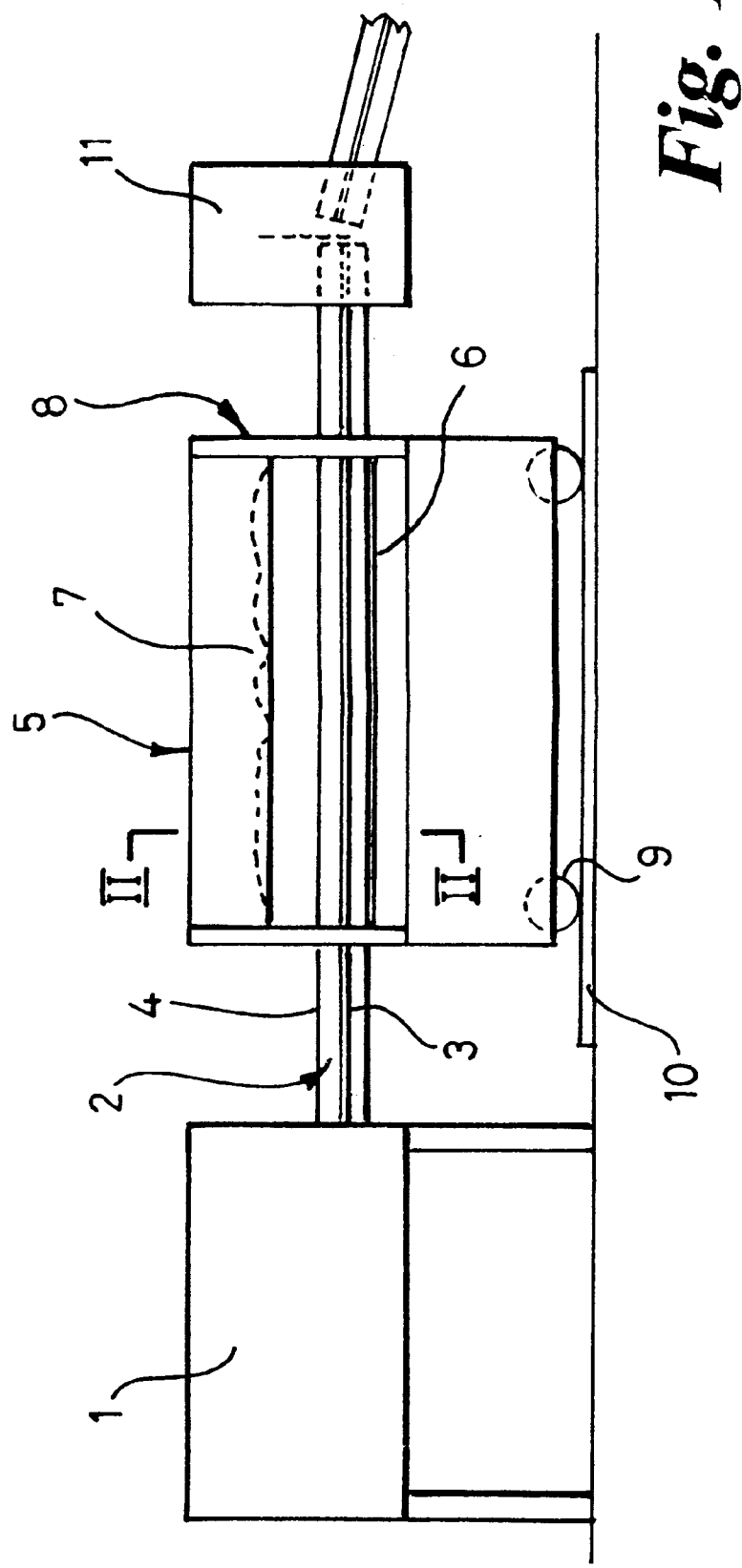
FIG. 1 is a longitudinal elevation view of an on-line assembly of extruder and heated press.
Figure 2:
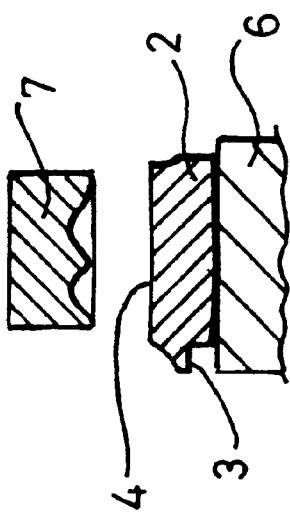
FIG. 2 is a transverse sectional view of the heated press taken along the line II—II in FIG. 1.

As illustrated in FIGS. 1 and 2, the production line assembly comprises firstly an extruder 1 from which foamed polystyrene or other plastics material is continuously extruded. In the examples shown, the extrusion 2 is destined to become a series of picture frame members and has a generally rectangular cross-section with a depth of between 1 and 3 centimeters and a width of 4 to 8 centimeters and with a rebate 3 along one edge intended to accommodate a picture and glazing panel. The outer, in use, (upper, as shown) face 4 of the extrusion 2 is to be ornamented.

As the extrusion 2 progresses from the extruder 1 it enters a 3 meter long hot stamp press 5 being a hydraulic press having an underlying support platen 6 and an overhanging dye 7 configured to stamp the desired detail of ornamentation into the upper face 4 of the extrusion 2.

Both the platen 6 and dye 7 are heated, suitably electrically under thermo-static control.

Careful control of the temperature gradient across the extrusion 2 enables an inherent tendency of the extrusion 2 to bow upwardly to be counteracted. More particularly, beating of the platen 6 preferably by use of heated oil circulating through it, counteracts the upward bowing tendency of the extrusion 2 under pressure. Generally, the greater the depth of impression to be made onto the extrusion 2 the greater the tendency to bow and the greater the temperature of the platen 6 needs to be to counteract this.

The precise temperatures and pressures and compression times within the hot stamp press 5 are selected to suit the nature of the extrusion to be ornamented and the depth of ornamentation. The required temperature, pressure and time are generally substantially lower than for corresponding injection moulding technique and, therefore, the energy input required is relatively low. Temperatures of between 100 and 180° C. are not untypical and compression times are generally between 10 and 40 seconds with pressures of the order of, for example, 5 to 10 bars per square centimeter. Temperatures below 140° C. are preferable when compression times of greater than 60 seconds are used, to avoid risk of edge damage to the moulding.

The preferred size of the press 5 is of the order of 3 m in length and 70 cm width. This enables, for example, three or four picture frame members to be pressed simultaneously alongside each other. A press of 70 cm width is also well-suited to moulding of, for example, a cabinet door which is commonly 60 cm in width.

To accommodate for the continuous progression of the extrusion 2, in the illustrated assembly the hot stamp dye 5 is adapted to advance with the extrusion 2 at the same rate as the extrusion 2 by means of motorised transport carriage 8 with wheels 9 that roll along a track 10 co-extensive with the production line.

Once the ornament or moulding has been pressed on to the upper face 4 of the extrusion 2 the sectioning machine 11 cuts the extrusion into the desired lengths.

Although illustrated with respect to a picture frame member extrusion 2, the method has found applicability to a range of different items of furniture or building members. Ornamented chair legs and backs may be formed by this process as may cabinet doors and other more sizeable members.

Although the invention has been described with respect to a continuous extrusion process, the method in the invention may be carried out in discreet extrusion and hot stamp pressing stages with the extruder 1 and press 5 off-line relative to each other but suitably within convenient distance.

A positive benefit is obtained by pressing the extrusion 2 shortly after it is extruded most especially when it is of a foamed nature since this assists in the ease of pressing and reduction of need for energy inputs at the pressing stage.

In further refined aspects of the invention it has been found that hot stamp pressing of extrusions provides a distinctive somewhat distressed surface characteristic. This is most notable with "gold" or otherwise wood-coloured plastics which upon heating in the hot stamp press 5 are slightly facially burnt. The result of this effect is generally aesthetically desirable rendering the plastics material with an appearance similar to wood and, therefore, better disguising the artificiality of the material.

If desired, hot stamp foil as is commonly used in the picture frame manufacturing industry for adorning plastics extrusions with transfer patterns, can be conveniently applied to the moulding actually within the hot stamp press 5 avoiding the need for a separate application process. Suitably the hot stamp foil is reeled through the hot stamp press 5 with rollers being positioned at the entrance and exit to the press 5 so that the transfer foil passes over their rounded surfaces and is not accidentally pierced. The rollers or additional rollers may act as spindles to remove the used foil tape and to pick up the slack. The foil is suitably laid against the plastics extrusion prior to the press 5 being operated to press down upon it.

I claim:

1. A system for forming ornamented plastics articles from at least partially solidified plastics extrusion having a thickness, a length, a width and a overall profile, the system comprising: a plastics extruder in combination with a hot stamp press having a platen and a heated mould-forming press, to, in turn, remold at least one surface of the plastics extrusion along the length thereof from the plastics extruder, while substantially retaining the overall profile of the ornamented plastics article, wherein the platen of the hot stamp press includes a means for precluding bowing of the plastics extrusion, which means comprises means for heating the platen of the hot stamp press and means for controlling the temperature of the heated platen of the press, to, in turn, allow adjustment to a desired temperature that prevents bowing of the plastics extrusion.

2. A system as claimed in claim 1, wherein the hot stamp press is a hydraulic press of a meter or longer, and preferably of the order of 3 meters in length.

3. A system as claimed in claim 1, wherein the hot stamp press has associated therewith a dispenser for hot stamp foil to dispense hot stamp foil within the hot stamp press to enable transfer patterns on the hot stamp foil to be transferred to the plastics extrusion upon pressing by the hot stamp press.

4. A system as claimed in claim 1 wherein the plastics extrusion includes a thickness of between 1 to 3 centimeters.

5. A system as claimed in claim 1 wherein the width of the plastics extrusion comprises approximately 70 centimeters.

6. A system as claimed in claim 1 further including means for transporting the hot stamp press away from the plastics extruder at a speed substantially equal to the speed of the extruding plastics material.

7. A system as claimed in claim 1 wherein the temperature control means controls the temperature thereof between 100 and 180 degrees centigrade.

8. A system as claimed in claim 1 wherein the hot stamp press includes means for controlling the pressure thereof between 5 and 10 bars per square centimeter.

9. A system as claimed in claim 1 further including a sectioning machine associated with the hot stamp press, to, in turn, section the extrusion into desired lengths.

10. A method of forming ornamented plastics articles comprising:

extruding an at least partially solidified plastics extrusion having a thickness, a length, a width and a overall profile;

positioning the plastics extrusion within a hot stamp press, the hot stamp press having a platen and a heated mould-forming press;

heating at least a portion of the plastics extrusion to a desired predetermined temperature;

heating the platen of the hot stamp press;

applying substantially uniform pressure with the heated platen along the length and the width of the extrusion;

remolding at least one surface of the plastics extrusion, along the length thereof;

retaining the overall profile of the plastics extrusion;

controlling the temperature of the heated platen of the press, to, in turn, allow adjustment to a desired temperature while preventing bowing of the plastics extrusion; and removing the plastics extrusion from within the hot stamp press.

11. The method according to claim 10 further including the step of sectioning the extrusion into desired lengths with a sectioning machine.

\* \* \* \* \*